(12) United States Patent
Fujiwara et al.

(10) Patent No.: US 7,283,907 B2
(45) Date of Patent: Oct. 16, 2007

(54) VEHICLE OPERATION ASSISTING SYSTEM

(75) Inventors: Yukihiro Fujiwara, Wako (JP); Mitsuharu Kanaboshi, Wako (JP); Yasushi Shoda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 248 days.

(21) Appl. No.: 11/120,174

(22) Filed: May 2, 2005

(65) Prior Publication Data

US 2005/0267683 A1  Dec. 1, 2005

(30) Foreign Application Priority Data

May 14, 2004  (JP)  ............................. 2004-145304

(51) Int. Cl.
*B60T 7/00* (2006.01)
(52) U.S. Cl. ....................................... 701/301; 342/70
(58) Field of Classification Search ................ 701/300, 701/301, 302; 342/70, 118, 61, 72, 175; 340/435, 436, 438
See application file for complete search history.

(56) References Cited

U.S. PATENT DOCUMENTS

| | | | | |
|---|---|---|---|---|
| 4,165,511 A | * | 8/1979 | Wocher et al. | 342/70 |
| 5,416,713 A | * | 5/1995 | Kameda et al. | 701/301 |
| 6,675,096 B2 | * | 1/2004 | Matsuura | 701/301 |
| 6,825,756 B2 | * | 11/2004 | Bai et al. | 340/435 |
| 7,099,764 B2 | * | 8/2006 | Seto et al. | 701/70 |

FOREIGN PATENT DOCUMENTS

| | | |
|---|---|---|
| JP | 07-021500 | 1/1995 |
| JP | 10-138894 | 5/1998 |
| JP | 2000-040148 | 2/2000 |
| JP | 2001-253330 | 9/2001 |

\* cited by examiner

*Primary Examiner*—Dalena Tran
(74) *Attorney, Agent, or Firm*—Carrier, Blackman, & Associates, P.C.; Joseph P. Carrier; William D. Blackman

(57) ABSTRACT

A vehicle operation assisting system includes an assist yaw rate calculator which calculates an assist yaw rate necessary to avoid an obstacle based on a detection result of the obstacle by a radar device, an actual vehicle moving amount calculator which calculates an actual vehicle moving amount from a yaw rate and a lateral acceleration of a vehicle. When an avoiding operation detector determines an avoiding operation of a driver, a target vehicle moving amount setting device replaces a standard moving amount based on an avoiding operation of a driver with the assist yaw rate, and a vehicle movement controller controls lateral movement of the vehicle so that the actual vehicle moving amount agrees with the assist yaw rate. At this time, in addition to the yaw rate, the lateral acceleration is also used for calculating the actual vehicle moving amount, and therefore an upset of the vehicle behavior can be avoided by properly controlling the lateral movement of the vehicle on a road having a low friction coefficient on which the tires easily skid. A vehicle operation assisting system capable of properly performing an obstacle avoiding operation and a restoring operation even on a road having a low friction coefficient is thereby provided.

15 Claims, 6 Drawing Sheets

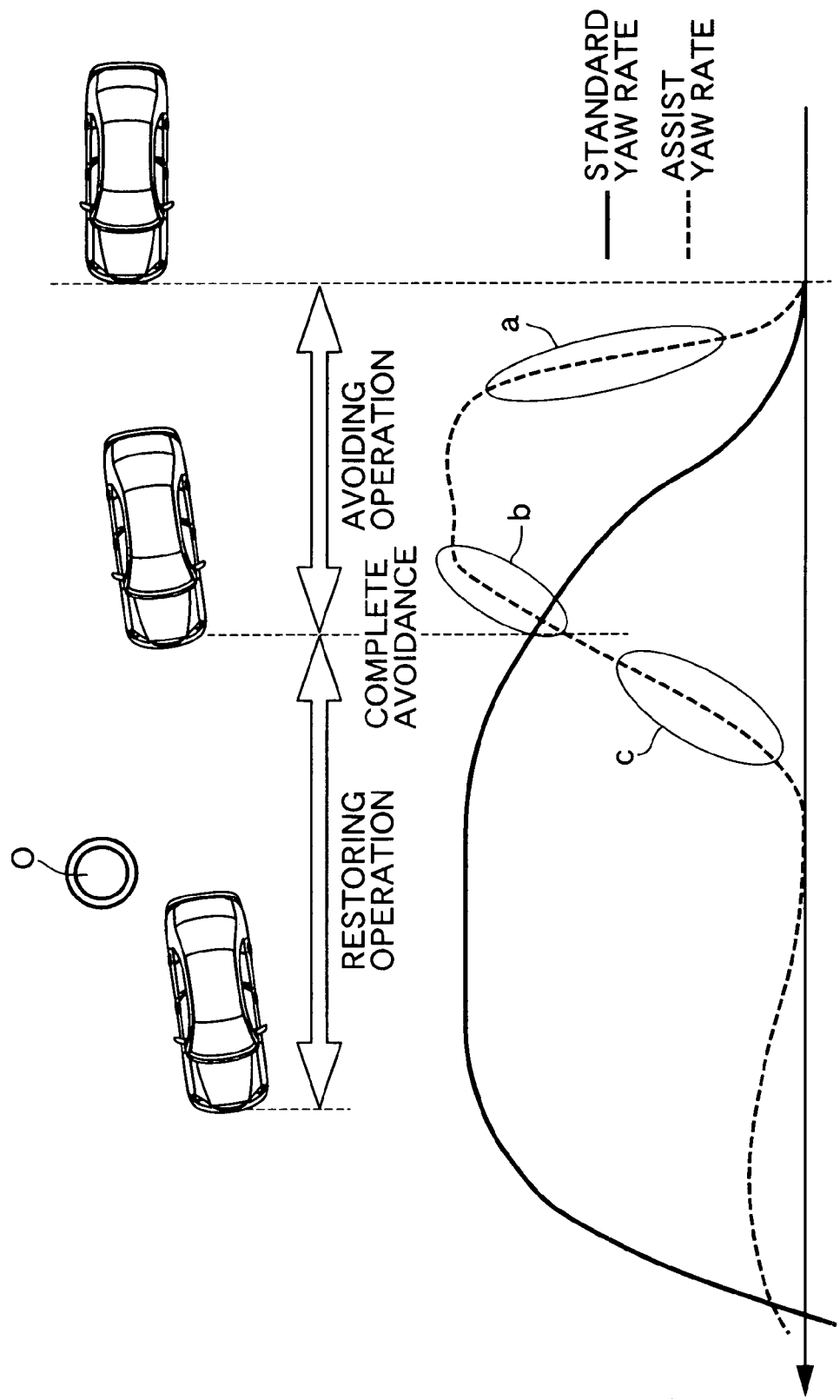

VEHICLE OPERATION ASSISTING SYSTEM

RELATED APPLICATION DATA

Japanese priority application No. 2004-145304, upon which the present application is based, is hereby incorporated in its entirety herein by reference.

BACKGROUND OF THE INVENTION

1. Field of the Invention

The present invention relates to a vehicle operation assisting system for assisting an obstacle avoiding operation of a vehicle and a restoring operation following the avoiding operation.

2. Description of the Related Art

Japanese Patent Application Laid-open No. 7-21500 discloses an automatic brake control system which determines the possibility of the subject vehicle on which the system is installed colliding with an obstacle based on a distance between the subject vehicle and the obstacle and a relative speed detected by the radar device; and automatically actuates a brake device of the vehicle when the possibility of collision is confirmed. In this system, when it is determined that collision with the obstacle cannot be avoided by only the braking force by the brake device and a steering operation of the driver which is detected, the turning property of the vehicle is enhanced by individually controlling braking forces of the left and right wheels and generating a yaw moment, thereby avoiding collision.

Also, Japanese Patent Application Laid-open No. 10-138894 discloses an automatic braking control system for avoiding collision by performing automatic braking when a radar device detects an obstacle ahead of the subject vehicle. In this system, when the driver performs a steering operation to avoid collision, a steering avoiding ability indicative of an ability of avoiding the obstacle is calculated based on the steering operation amount, and the magnitude of the braking force of automatic braking is controlled in accordance with the steering avoiding ability, thereby effectively securing the ability of avoiding an obstacle by the steering operation.

When a necessary target yaw rate to avoid collision with an obstacle ahead of the subject vehicle, which is detected by the radar device, is calculated, and yaw moment is generated by giving a braking force difference to the left and right wheels or by operating a power steering device, thereby performing a feedback control so that the actual yaw rate of the subject vehicle agrees with the aforesaid target yaw rate, there is a possibility that proper obstacle avoidance becomes difficult on a road having a low friction coefficient.

Namely, when the tire hardly skids on a road having a high friction coefficient, a yaw rate properly corresponding to the vehicle speed and the turning radius is detected, but when the wheels easily skid on a road having a small friction coefficient, there is a possibility that a yaw rate is detected because the vehicle rotates without properly turning, so that the angle of side slip of the tires increases. In the case where the vehicle rotates to generate the yaw rate in this way, if the feedback control is performed so that the yaw rate agrees with the target yaw rate, there arises a fear that the vehicle behavior cannot be properly controlled due to spin.

SUMMARY OF THE INVENTION

The present invention has been achieved in view of the above-mentioned circumstances, and has as an object thereof to provide a vehicle operation assisting system capable of properly performing an obstacle avoiding operation and a subsequent restoring operation even on a road having a low friction coefficient.

In order to achieve the object, according to a first feature of the present invention, there is provided a vehicle operation assisting system which assists an object avoiding operation of a vehicle and a restoring operation following the avoiding operation, comprising: obstacle detecting means for detecting an obstacle ahead of a subject vehicle; avoiding operation determining means for determining initiation of the obstacle avoiding operation by a driver; avoiding moving amount calculating means for calculating a necessary avoiding moving amount to avoid the obstacle based on an output of the obstacle detecting means; actual vehicle moving amount calculating means for calculating an actual vehicle moving amount $D^*$ from a yaw rate and a lateral acceleration of the vehicle; target vehicle moving amount setting means for replacing a standard moving amount based on an avoiding operation of the driver with an avoiding moving amount calculated by the avoiding moving amount calculating means when the avoiding operation determining means determines the start of the avoiding operation of the driver; and vehicle movement control means for controlling lateral movement of the vehicle so that the actual vehicle moving amount calculated by the actual vehicle moving amount calculating means agrees with the avoiding moving amount.

In addition to the first feature, according to a second feature of the present invention, the actual vehicle moving amount calculating means calculates the lateral acceleration of the vehicle as the actual vehicle moving amount in a period of the avoiding operation; and in a period of the restoring operation, a linear sum of the lateral acceleration and the yaw rate of the vehicle is calculated as the actual vehicle moving amount and a ratio of the yaw rate is gradually increased by gradually decreasing a ratio of the lateral acceleration.

Assist yaw rate calculating means M8 of the embodiment corresponds to the avoiding moving amount calculating means of the present invention, and a first radar device Sa of the embodiment corresponds to obstacle detecting means of the present invention.

With the first feature, while the avoiding moving amount calculating means calculates an avoiding moving amount necessary for avoiding an obstacle based on a detection result of the obstacle by the obstacle detecting means, the actual vehicle moving amount calculating means calculates an actual vehicle moving amount from the yaw rate and the lateral acceleration of the vehicle. When the avoiding operation determining means determines the start of an avoiding operation by a driver to avoid the obstacle, the target vehicle moving amount setting means replaces the standard moving amount based on the avoiding operation of the driver with the avoiding moving amount calculated by the avoiding moving amount calculating means, and the vehicle movement control means controls the lateral movement of the vehicle so that the actual vehicle moving amount agrees with the avoiding moving amount. At this time, in addition to the yaw rate, also the lateral acceleration is used for calculating the actual vehicle moving amount, and therefore an upset of the vehicle behavior can be avoided by properly controlling the lateral movement of the vehicle on a road having a low friction coefficient on which the tires easily skid.

With the second feature, in the period of the avoiding operation, the lateral acceleration of the vehicle is calculated as the actual vehicle moving amount, and therefore the yaw rate occurring with the side slip of the tires is prevented from being erroneously recognized as the yaw rate with the normal turning. In the period of the restoring operation, the linear sum of the lateral acceleration and the yaw rate of the vehicle is calculated as the actual vehicle moving amount, and the ratio of the yaw rate is gradually increased by gradually decreasing the ratio of the lateral acceleration, so that it is possible to smoothly shift the operation to the subsequent normal operation in which the feedback control based on the yaw rate is performed, which follows the restoring operation.

The above-mentioned object, other objects, characteristics, and advantages of the present invention will become apparent from an explanation of a present embodiment, which will be described in detail below by reference to the attached drawings.

BRIEF DESCRIPTION OF THE DRAWINGS

FIG. 6 is a graph showing a standard yaw rate and an assist yaw rate.

DESCRIPTION OF THE PRESENT EMBODIMENT

Figure 1:
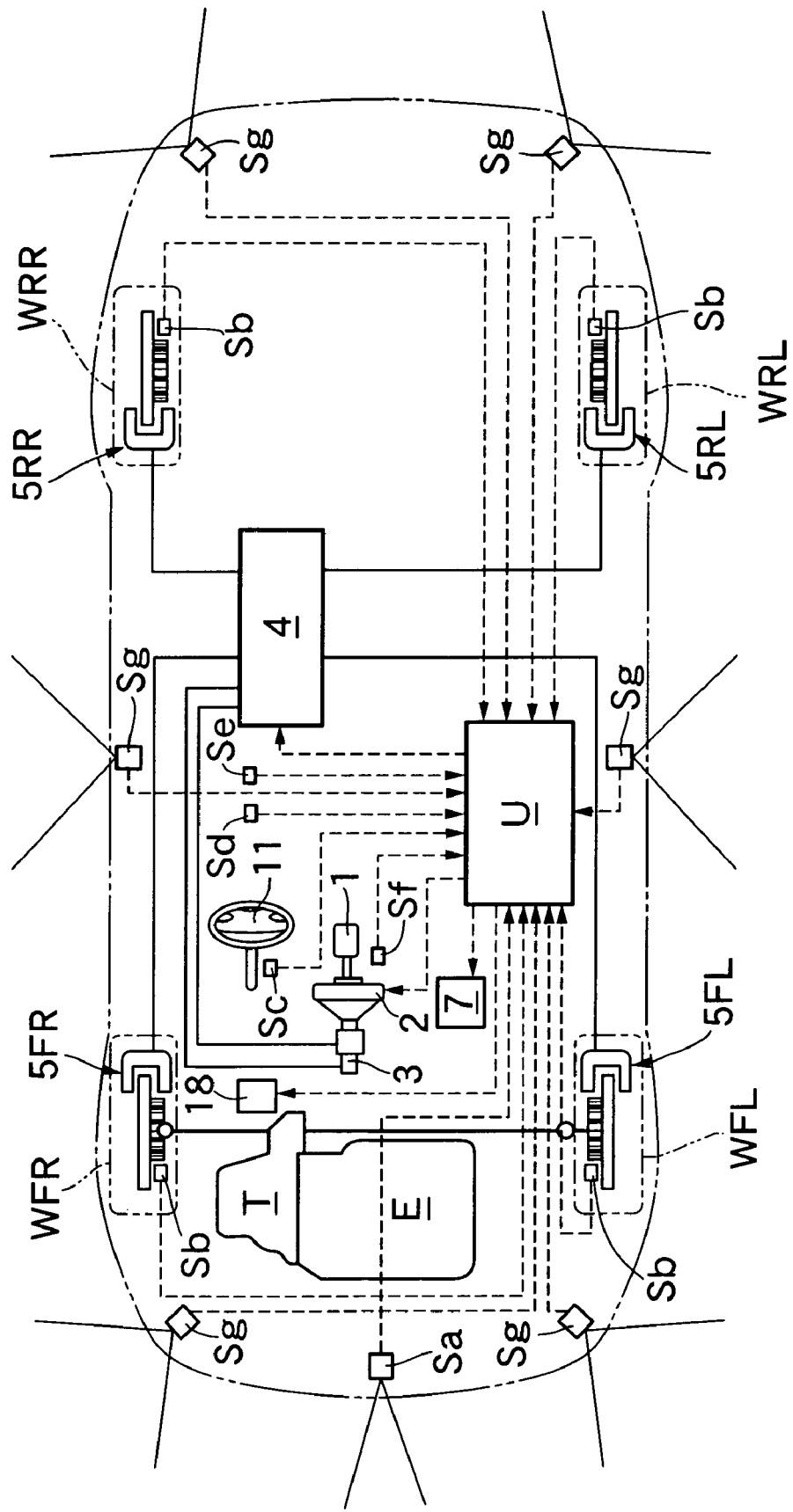
FIG. 1 is a view showing an entire construction of an automobile mounting an operation assisting system according to an embodiment of the present invention.
Figure 2:
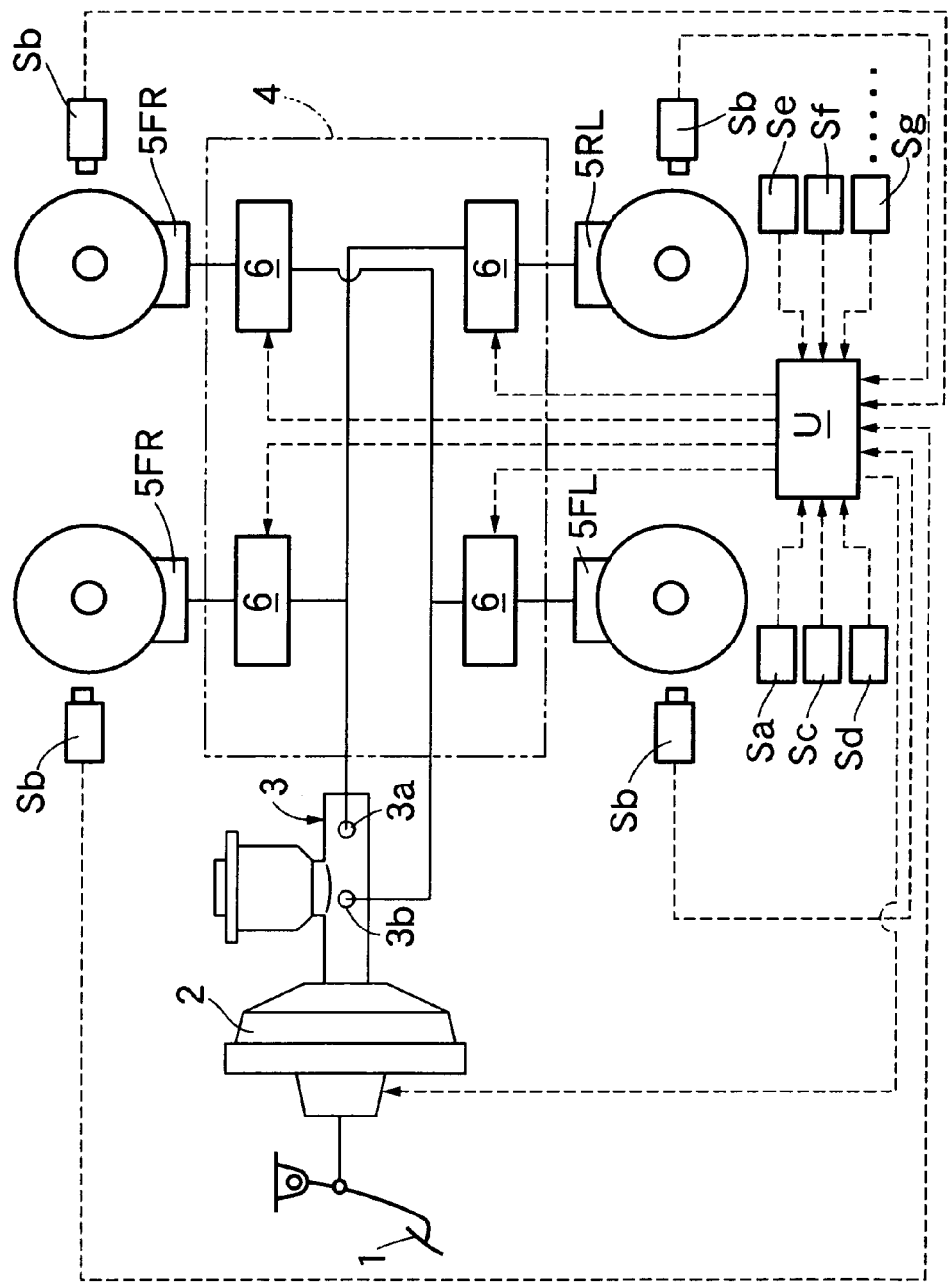
FIG. 2 is a block diagram showing a construction of a braking device.

As shown in FIGS. 1 and 2, a four-wheel vehicle mounting an operation assisting system of this embodiment includes left and right front wheels WFL and WFR as driven wheels to which a driving force of an engine E is transmitted via a transmission T, and left and right rear wheels WRL and WRR as follower wheels rotating with traveling of the vehicle. A brake pedal 1 operated by a driver is connected to a master cylinder 3 via an electronic control negative pressure booster 2 constructing a part of the braking device of the present invention. The electronic control negative pressure booster 2 operates the master cylinder 3 by mechanically boosting the pressing force applied to the brake pedal 1, and operates the master cylinder 3 by a braking command signal from an electronic control unit U without the operation of the brake pedal 1 at the time of automatic braking. When a pressing force is inputted onto the brake pedal 1, and the braking command signal is inputted from the electronic control unit U, the electronic control negative pressure booster 2 outputs a brake hydraulic pressure corresponding to a larger one of the pressing force and the braking command signal. An input rod of the electronic control negative pressure booster 2 is connected to the brake pedal 1 via a lost motion mechanism, and even when the electronic control negative pressure booster 2 is operated by the signal from the electronic control unit U and the input rod is moved forward, the brake pedal 1 remains in the initial position.

A pair of output ports 3a and 3b of the master cylinder 3 are connected to brake calipers 5FL, 5FR, 5RL and 5RR respectively provided at the front wheels WFL and WFR and the rear wheels WRL and WRR, via a hydraulic control device 4 constituting a part of the braking device of the present invention. The hydraulic control device 4 includes four pressure regulators 6 corresponding to the four brake calipers 5FL, 5FR, 5RL and 5RR. The respective pressure regulators 6 are connected to the electronic control unit U, and individually control the operations of the brake calipers 5FL, 5FR, 5RL and 5RR provided at the front wheels WFL and WFR and the rear wheels WRL and WRR.

Accordingly, if the brake hydraulic pressure transmitted to each of the brake calipers 5FL, 5FR, 5RL and 5RR is independently controlled by the pressure regulators 6 when the vehicle turns, the yaw moment of the vehicle is controlled as desired by generating a difference in the braking forces of the left and right wheels, and the vehicle behavior at the time of turning can be stabilized. Also, if the brake hydraulic pressure which is transmitted to each of the brake calipers 5FL, 5FR, 5RL and 5RR is independently controlled at the time of braking, the antilock brake control for suppressing locking of the wheels can be performed.

Figure 3:
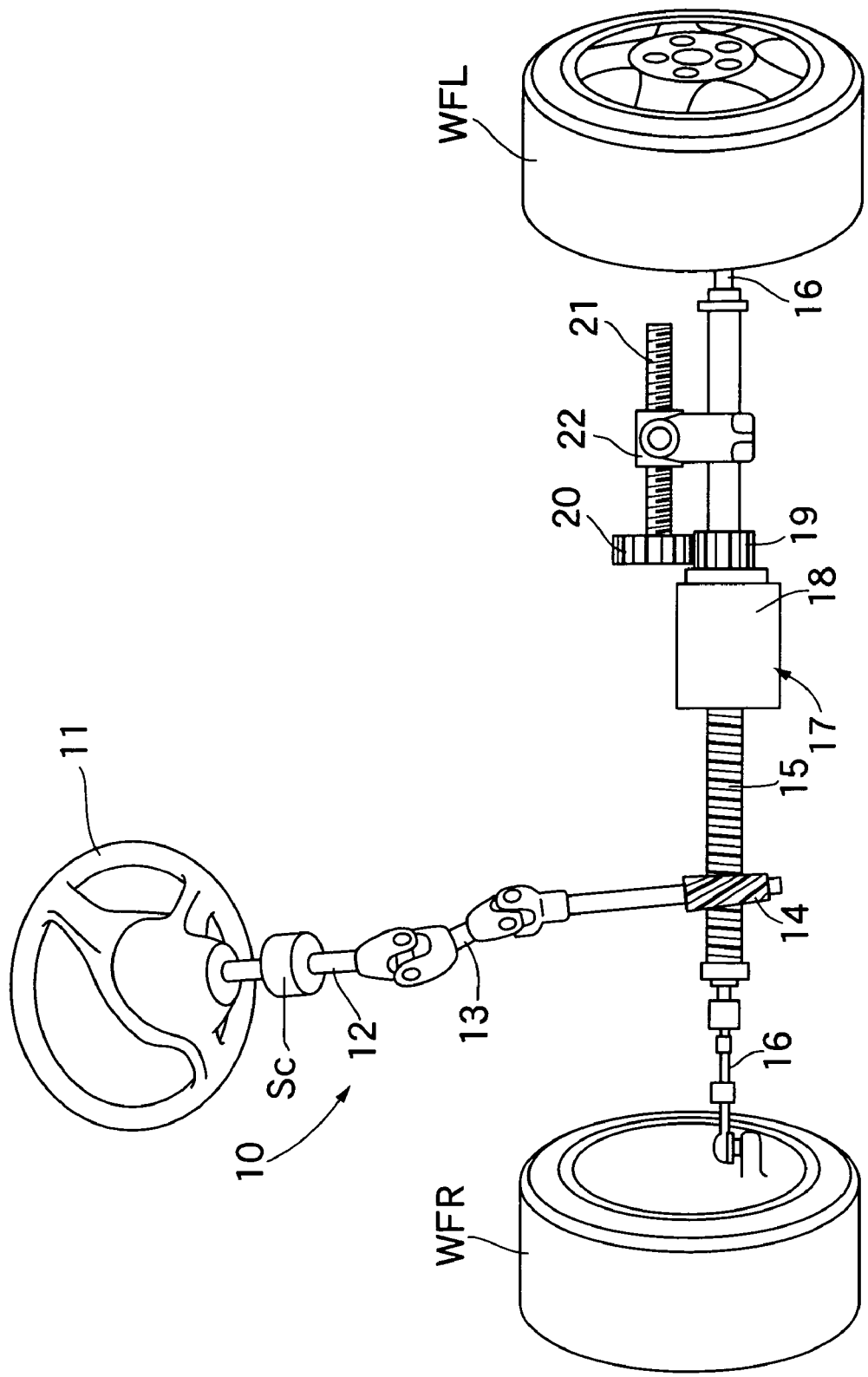
FIG. 3 is view showing a construction of a steering device.

FIG. 3 shows a structure of a steering device 10 of the vehicle. Rotation of a steering wheel or handle 11 is transmitted to a rack 15 via a steering shaft 12, a connecting shaft 13 and a pinion 14; and the reciprocating motion of the rack 15 is further transmitted to left and right front wheels WFL and WFR via left and right tie rods 16 and 16. A power steering device 17 provided at the steering device 10 includes a driven gear 19 provided at an output shaft of a steering actuator 18, a follower gear 20 meshed with this driven gear 19, a screw shaft 21 integral with the follower gear 20, and a nut 22 meshed with the screw shaft 21 and connected to the rack 15. Accordingly, if the steering actuator 18 is driven, the driving force can be transmitted to the left and right front wheels WFL and WFR via the driven gear 19, the follower gear 20, the screw shaft 21, the nut 22, the rack 15 and the left and right tie rods 16 and 16.

Connected to the electronic control unit U are: a first radar device Sa which transmits electromagnetic waves such as millimeter waves to an area ahead of the vehicle body, and detects a relative distance between an obstacle and the subject vehicle, a relative speed of the obstacle and the subject vehicle, a relative position of the obstacle and the subject vehicle and the size of the obstacle based on the reflected waves; wheel speed sensors Sb which respectively detect the rotational frequencies of the front wheels WFL and WFR and the rear wheels WRL and WRR; a steering angle sensor Sc which detects a steering angle δ of the steering wheel 11; a yaw rate sensor Sd which detects a yaw rate γ of the vehicle; a lateral acceleration sensor Se which detects a lateral acceleration YG of the vehicle; a brake operation sensor Sf which detects the operation of the brake pedal 1; and a plurality of second radar devices Sg which transmit electromagnetic waves such as laser and detects an obstacle such as a proximal vehicle around the subject vehicle based on the reflection waves.

A laser radar can be used instead of the first radar device Sa comprising a millimeter wave radar, and a television camera or the like can be used instead of the second radar devices Sg each comprising a laser radar.

The electronic control unit U controls the electronic control negative pressure booster 2, the hydraulic pressure control device 4, the steering actuator 18 and warning means 7 such as a buzzer, a lamp, a chime and a speaker, based on the signals from the first radar device Sa and the second radar devices Sg and the signal from each of the sensors Sb to Sf.

Figure 5:
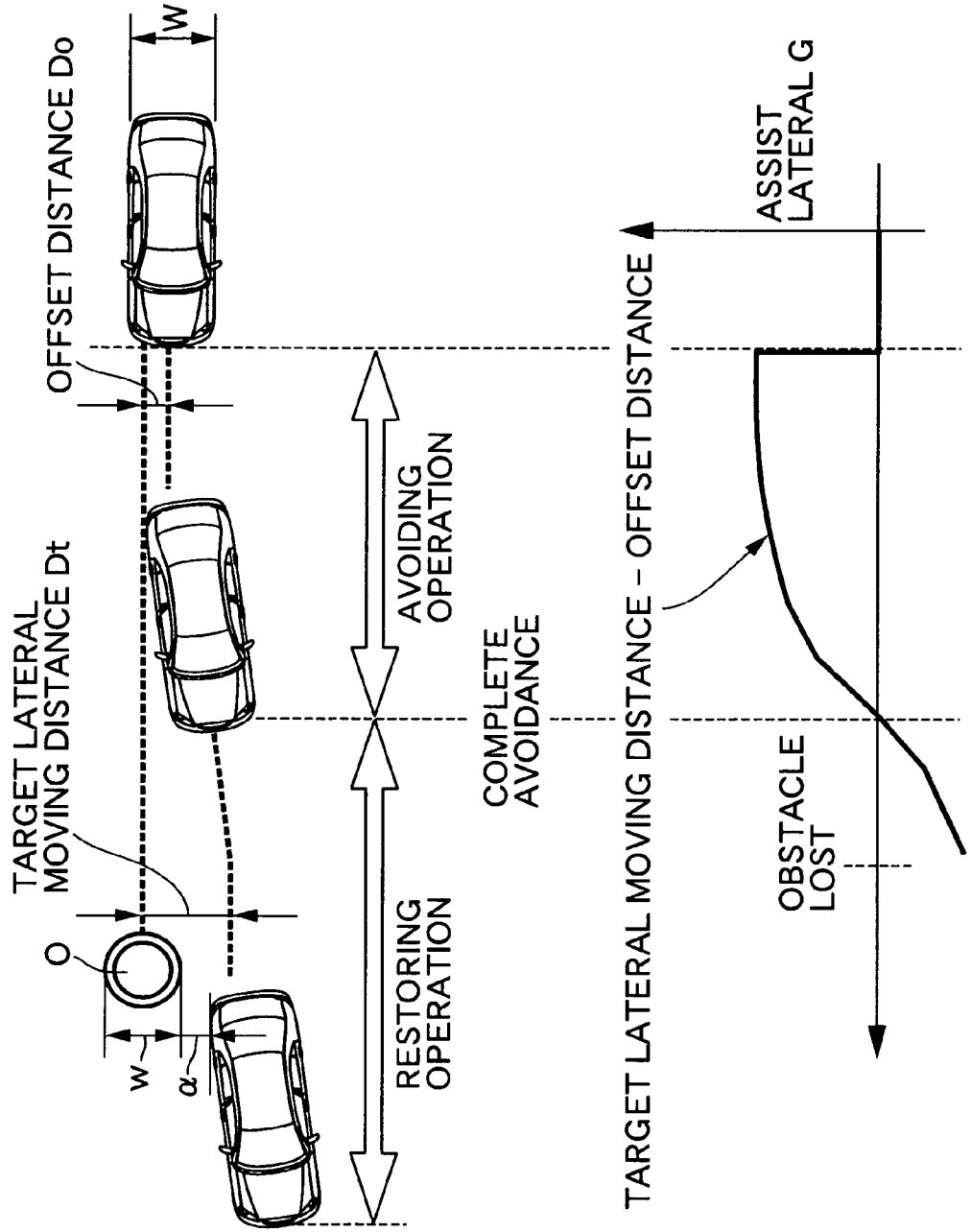
FIG. 5 is a graph showing relationships between an offset distance and a target lateral moving distance and assist lateral acceleration.

As shown in FIG. 5, in addition to the relative speed and the relative distance between the obstacle O and the subject vehicle, the first radar device Sa also detects a lateral width w of an obstacle O, and a deviation of the center of the obstacle O with respect to the center line of the subject vehicle, namely, an offset distance Do.

Figure 4:
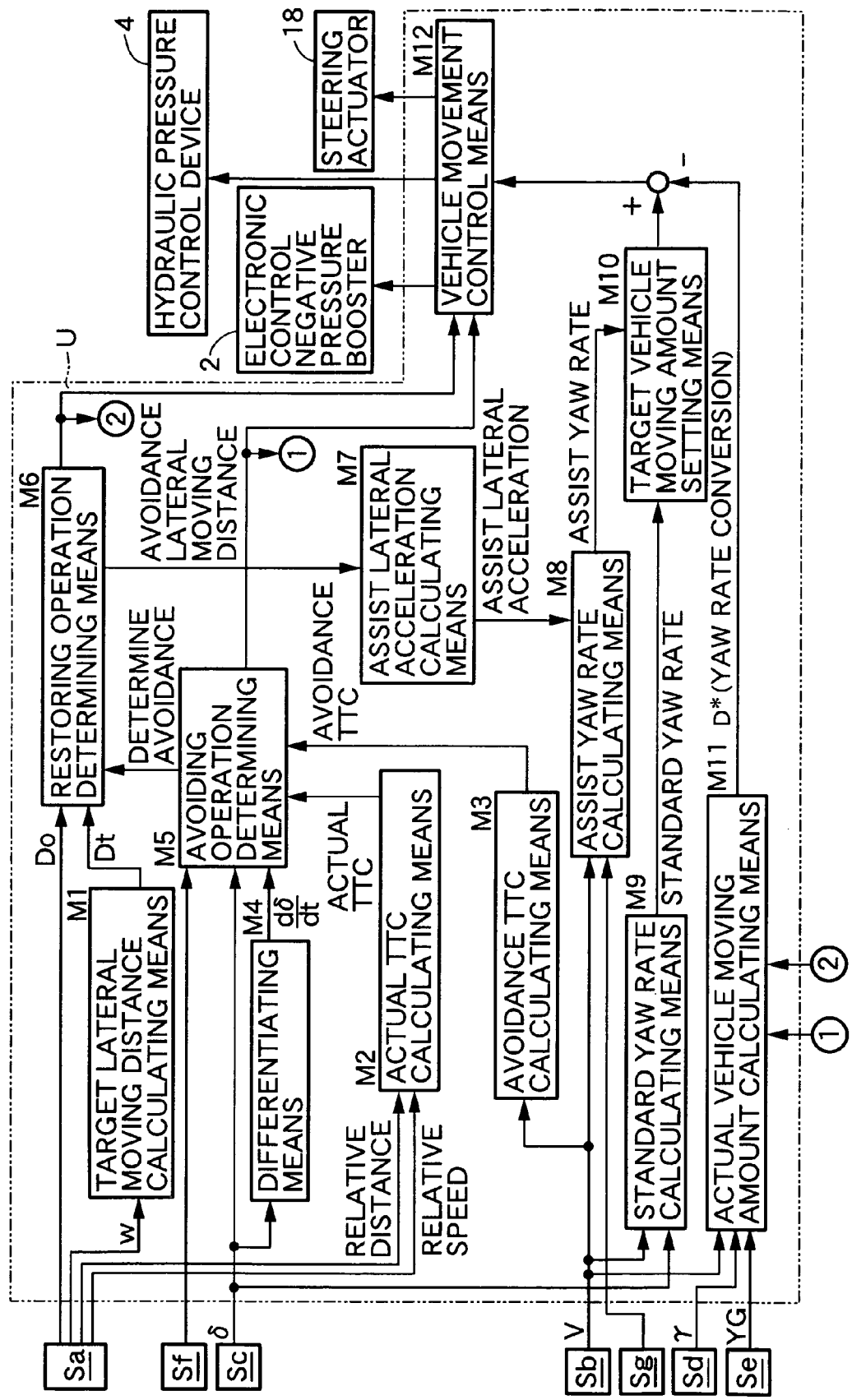
FIG. 4 is a block diagram of a control system of the operation assisting system.

As shown in FIG. 4, the electronic control unit U includes: target lateral moving distance calculating means M1; actual TTC calculating means M2 (TTC: time to collision); avoidance TTC calculating means M3; differentiating means M4; avoiding operation determining means M5; restoring operation determining means M6; assist lateral acceleration calculating means M7; assist yaw rate calculating means M8; standard yaw rate calculating means M9; target vehicle moving amount setting means M10; actual vehicle moving amount calculating means M11; and vehicle movement control means M12.

Next, an operation of the embodiment of the present invention including the above described construction will be described with reference mainly to FIG. 4.

First in FIG. 5, when the obstacle O exists ahead of the subject vehicle, collision with the obstacle O is avoided by operating the steering wheel 11 in one direction, and the subject vehicle is restored to the original course by operating the steering wheel 11 in the other direction after avoiding collision with the obstacle O. The former operation is called an avoiding operation, and the latter operation is called a restoring operation. As the general tendency of a driver, the operation amount of the steering handle 11 becomes insufficient or excessive in the avoiding operation, and restoring of the steering handle 11 is delayed in the restoring operation. Therefore, the restoring amount becomes too large, providing a possibility that lateral skid occurs, which results in spin. In this embodiment, avoidance of the obstacle O is performed smoothly by assisting the avoiding operation and the restoring operation by control of the braking force and control of the power steering device 17.

For this purpose, the target lateral moving distance calculating means M1 calculates a target lateral moving distance Dt necessary for the subject vehicle to avoid the obstacle O, by using the following equation and a lateral width w of the obstacle O detected by the first radar device Sa, a known subject vehicle lateral width w and a predetermined margin α:

$$Dt = (w/2) + (W/2) + \alpha.$$

It is the most difficult to avoid collision of the subject vehicle and the obstacle O when a center of the obstacle O lies on the center line of the subject vehicle, namely, when the obstacle O lies right in front of the subject vehicle. Even in this case, if the subject vehicle moves in the lateral direction only by the target lateral moving distance Dt, the subject vehicle can pass beside the obstacle O with a clearance corresponding to the margin α (see FIG. 5) with respect to the obstacle O.

The actual TTC calculating means M2 calculates the actual TTC by dividing the relative distance from the obstacle O detected by the first radar device Sa by the relative speed, regarding the longitudinal acceleration of the subject vehicle as zero. The actual TTC corresponds to the actual time until the subject vehicle collides with the obstacle O.

The avoidance TTC calculating means M3 calculates an avoidance TTC which is a threshold value used when it is determined that the collision avoiding operation of the driver is performed in the avoiding operation determining means M5 which will be described later. The avoidance TTC is set in the predetermined range in accordance with the vehicle speed V of the subject vehicle calculated from the outputs of the wheel speed sensors Sb.

The differentiating means M4 calculates a steering angular speed dδ/dt by performing time differential for the steering angle δ of the steering wheel 11 detected by the steering angle sensor Sc.

The avoiding operation determining means M5 determines whether or not the driver performs an operation for avoiding an obstacle O based on the operation of the brake pedal 1 by the driver detected by the brake operation sensor Sf and the steering angle δ of the steering wheel 11 of the driver detected by the steering angle sensor Sc. The determination is started when the actual TTC becomes the avoidance TTC or less. The determination as to whether or not the driver has performed the obstacle avoiding operation is performed in the following two different modes.

The first mode corresponds to the case where the actual TTC is a predetermined value or more (namely, when a time allowance until collision is relatively large). In this first mode, it is determined that the driver has performed the operation for avoiding the obstacle O, when the brake operation sensor Sf detects the brake operation of the driver, the steering angle speed dδ/dt outputted by the differentiating means M4 is a predetermined value (for example, 0.6 rad/sec) or higher, and the steering angle δ outputted by the steering angle sensor Sc is a predetermined value (for example, 6 rad) or less.

The second mode corresponds to the case where the actual TTC is less than the predetermined value (namely, a time allowance until collision is relatively small). In this second mode, it is determined that the driver has performed an operation for avoiding the obstacle O, when the steering angular speed dδ/dt outputted by the differentiating means M4 is a predetermined value (for example, 0.6 rad/sec) or more, and the steering angle δ outputted by the steering angle sensor Sc is a predetermined value (for example, 6 rad) or less, without requiring detection by the brake operation sensor Sf for the brake operation by the driver.

As a general behavior of a driver, the driver operates the steering wheel 11 after first pressing the break pedal 1 when there is a time allowance before collision, but when there is no time allowance before collision, the driver often first operates the steering wheel 11 without pressing the brake pedal 1. Therefore, the determination accuracy can be enhanced by determining the obstacle avoiding operation by the driver in the two modes, divided as described above, of the obstacle avoiding operation.

The direction of the obstacle avoiding operation of the driver can be determined in accordance with the sign (+ or −) of the steering angle δ outputted by the steering angle sensor Sc.

The restoring operation determining means M6 determines a shift in an overall steering maneuver from the first half or avoiding operation to the second half or restoring operation. When the following first condition or the second condition is established, the restoring operation determining means M6 determines that the avoiding operation has substantially eliminated the possibility that the subject vehicle collides with the obstacle O, and shifts the operation to the restoring operation for restoring the attitude of the subject vehicle.

The first condition is the case where the distance difference Dt−Do between the target lateral moving distance Dt calculated by the target lateral moving distance calculating means M1 and the offset distance Do (deviation of the center of the obstacle O from the center line of the subject vehicle) detected by the first radar device Sa is 0 or less, namely, the case where the offset distance Do becomes larger than the target lateral moving distance Dt and there is no possibility of the subject vehicle colliding with the obstacle O. In this case, the distance difference Dt−Do which becomes a negative value is set at zero.

The second condition is the case where the actual TTC becomes less than a predetermined value, or the case where the first radar device Sa has lost sight/sense of the obstacle O. The former is the case where the actual TTC becomes small enough, and therefore the obstacle O is assumed to be avoided; and the latter is the case where the obstacle O is deviated enough in the lateral direction from the center line of the subject vehicle, and therefore the obstacle O is assumed to be avoided. In these cases, the distance difference Dt−Do is gradually decreased to zero.

When the operation is shifted from the avoiding operation to the restoring operation, the relative distance of the subject vehicle and the obstacle O outputted by the first radar device Sa is maintained. The reason is that when there is no possibility of collision with the obstacle O, it is not necessary to further decelerate the subject vehicle.

The assist lateral acceleration calculating means M7 calculates the assist lateral acceleration by multiplying the distance difference Dt−Do between the target lateral moving distance Dt and the offset distance Do by gain, as shown in FIG. 5. This assist lateral acceleration corresponds to the lateral acceleration which the subject vehicle needs to generate in order to avoid collision with the obstacle O.

The assist yaw rate calculating means M8 calculates an assist yaw rate by converting the assist lateral acceleration into the yaw rate by dividing the assist lateral acceleration calculated in the assist lateral acceleration calculating means M7 by the vehicle speed V of the subject vehicle calculated from the output of the wheel speed sensors Sb. In order that the value of the assist yaw rate does not diverge, the vehicle speed V is replaced with 1 km/h when it is 0 km/h. In the case where the second radar devices Sg detect another vehicle around the subject vehicle (especially another vehicle on a side or in the rear), the assist yaw rate calculating means M8 corrects the value of the assist yaw rate to be smaller when the possibility of the other vehicles interfering with the subject vehicle is higher.

The standard yaw rate calculating means M9 calculates the standard yaw rate based on the steering angle δ detected by the steering angle sensor Sc and the vehicle speed V of the subject vehicle calculated from the outputs of the wheel speed sensors Sb.

The target vehicle moving amount setting means M10 normally outputs the standard yaw rate inputted from the standard yaw rate calculating means M9 as it is, but replaces the standard yaw rate with the assist yaw rate outputted by the assist yaw rate calculating means M8, until the restoring operation is finished after the avoiding operation is determined by the avoiding operation determining means M5. When the restoring operation is finished, it gradually shifts the assist yaw rate to the standard yaw rate before the replacement as discussed below.

The actual vehicle moving amount calculating means S11 calculates the actual vehicle moving amount D* by weighting and adding the yaw rate γ detected by the yaw rate sensor Sd and the lateral acceleration YG detected by the lateral acceleration sensor Se. That is, since the yaw rate γ and the lateral acceleration YG differing in dimension cannot be simply added, the lateral acceleration YG detected by the lateral acceleration sensor Se is divided by the vehicle speed V to thereby convert the lateral acceleration YG into a yaw rate, which is added to the yaw rate γ detected by the yaw rate sensor Sd.

$$D^* = K1 \cdot (YG/V) + K2 \cdot \gamma$$

Here, K1 and K2 are weighted coefficients of the yaw rate γ and the lateral acceleration YG which change in accordance with the state of the vehicle.

Namely, when the avoiding operation determining means M5 determines the start of the avoiding operation for avoiding the obstacle O, the weighted coefficient K1 (0<K1<1) of the lateral acceleration YG is set at 1, and the weighted coefficient K2 (0≦K2≦1) of the yaw rate γ is set at zero. Namely, during avoiding operation of the obstacle O, the yaw rate γ is ignored and the actual vehicle moving amount D* is calculated based on the lateral acceleration YG.

When the avoiding operation is finished and the restoring operation determining means M6 determines the start of the restoring operation, the weighted coefficient K1 of the lateral acceleration YG is gradually decreased from 1 to 0, and the weighted coefficient K2 of the yaw rate γ is gradually increased from 0 to 1. Namely, during the restoring operation after avoiding the obstacle O, the actual vehicle moving amount D* is gradually changed from the one mainly based on the lateral acceleration YG to the one mainly based on the yaw rate γ. In other words, in the period of the restoring operation, the linear sum of the lateral acceleration and the yaw rate of the vehicle is calculated as the actual vehicle moving amount, with the ratio or relative percentage of the yaw rate gradually increasing by gradually degreasing the ratio or relative percentage of the lateral acceleration. Thus, according to the invention, after the restoring operation, it is possible to smoothly shift the operation back to the normal operation in which feedback control based on the yaw rate is performed.

The vehicle movement control means M12 performs feedback control of the operation of the electronic control negative pressure booster 2, the hydraulic control device 4 and the steering actuator 18 so that the deviation between the standard yaw rate outputted by the target vehicle moving amount setting means M10 and the actual vehicle moving amount D* outputted by the actual vehicle moving amount calculating means S11 converges to zero. On this occasion, until the restoring operation determining means M16 determines the restoring operation after the avoiding operation determining means M15 determines the avoiding operation, namely, during the period of the avoiding operation, the yaw moment is generated in the vehicle by operating the electronic control negative pressure booster 2 and the hydraulic control means 4 to generate a difference between the braking force of the left wheels WFL and WRL and the braking force of the right wheels WFR and WRR. After the restoring operation determining means M16 determines the restoring operation, namely, during the period of the restoring operation, yaw moment is generated in the vehicle by operating the steering actuator 18 to give a steering torque to the left and right front wheels WFL and WFR, whereby the deviation between the standard yaw rate after correction and the actual vehicle moving amount D* is converged to zero.

As described above, when the avoiding operation determining means M5 determines that the driver has performed the avoiding operation for avoiding collision with the obstacle O, the yaw rate corresponding to the distance difference Dt−Do between the target lateral moving distance Dt and the offset distance Do is generated by individually controlling the braking forces of the left and right wheels by operating the electronic control negative pressure booster 2 and the hydraulic pressure control means 4, and therefore the assist yaw rate can be generated to compensate the excess and deficiency of the steering operation by the driver (especially a delay and a deficiency of the steering operation), so that the obstacle O can be reliably avoided (see portion a in FIG. 6). When the avoidance of the obstacle O is ensured, the assist yaw rate is quickly decreased in accordance with the decrease in the distance difference Dt−Do, whereby the upset in the vehicle behavior can be minimized (see portion b in FIG. 6).

In the avoiding operation of the obstacle O, the assist yaw rate for avoidance is not generated by the power steering device 17, but is generated mainly by the feedback control in which the yaw rate of the vehicle is caused to agree with the standard yaw rate outputted by the target vehicle moving amount setting means M10 by individually controlling the braking forces of the left and right wheels. At this time, the yaw rate of the vehicle is the actual vehicle moving amount D* outputted by the actual vehicle moving amount calculating means M11, and the actual vehicle moving amount D* during avoiding operation substantially becomes the lateral acceleration YG of the vehicle, because the avoiding operation determining means M5 sets the weighted coefficient K1 of the lateral acceleration YG at 1, and sets the weighted coefficient K2 of the yaw rate γ at zero. Accordingly, the feedback control is performed so that the yaw rate converted into the lateral acceleration YG of the vehicle agrees with the assist yaw rate during the avoiding operation.

When the road friction coefficient is small, if the braking forces of the left and right wheels are individually controlled so that the actual yaw rate γ of the vehicle is caused to agree with the assist yaw rate, the actual yaw rate γ does not occur as a yaw rate by the normal turn with the tires gripping the road, but occurs as a yaw rate due to the change in the side slip angle of the tires (yaw rate due to rotating movement of the vehicle), so that the side slip angle increases to provide a possibility that the vehicle ultimately spins.

However, in this embodiment, instead of the actual yaw rate γ, the actual vehicle moving amount D* which is substantially the lateral acceleration YG of the vehicle is used in the feedback control, whereby normal turn by which a predetermined lateral acceleration occurs is maintained by suppressing the rotating movement of the vehicle to prevent the vehicle from spinning.

When the restoring operation determining means M6 determines the start of the restoring operation processing after avoiding the obstacle O, in the actual vehicle moving amount D*, the component of the lateral acceleration YG gradually decreases and the component of the yaw rate γ gradually increases, whereby the control can be smoothly shifted to the normal feedback control for making the actual yaw rate γ agree with the standard yaw rate when the restoring operation is completed.

At the time of the restoring operation, the amount of restoring the steering wheel 11 by the driver tends to be so large that the vehicle behavior is upset. However, in this embodiment, the assist yaw rate is not generated by the braking force of the wheel, but is generated mainly by the control of the steering actuator 18 of the power steering device 17 in the restoring operation, so that excessive steering restoring operation of the driver in the restoring operation is suppressed to stabilize the vehicle behavior (see portion c in FIG. 6).

When the assist yaw rate calculating means M8 calculates the assist yaw rate, if the second radar devices Sg detect another vehicle on the side of the subject vehicle or behind the subject vehicle, the assist yaw rate calculating means M8 corrects the assist yaw rate to be small in accordance with the proximity degree, and therefore the subject vehicle can be prevented from contacting the other vehicle by decreasing the lateral moving amount of the subject vehicle based on the automatic avoiding movement based on the assist yaw rate.

Further, when a proximal vehicle exists around the subject vehicle, if the avoiding operation determining means M5 determines the collision avoiding operation by the driver, the warning means 7 is operated to issue a warning to the driver, and inhibits the avoiding operation by the operation assisting system. However, the restoring operation by the operation assisting system after avoiding the obstacle O is carried out as usual.

The embodiment of the present invention has been described above, but various design changes can be made without departing from the subject matter of the present invention as claimed.

What is claimed is:

1. A vehicle operation assisting system which assists an obstacle avoiding operation of a vehicle and a restoring operation following the avoiding operation, comprising:
   obstacle detecting means for detecting an obstacle ahead of a vehicle;
   avoiding operation determining means for determining the obstacle avoiding operation by a driver;
   avoiding moving amount calculating means for calculating an avoiding moving amount necessary to avoid the obstacle based on an output of the obstacle detecting means;
   actual vehicle moving amount calculating means for calculating an actual vehicle moving amount from a yaw rate and a lateral acceleration of the vehicle;
   target vehicle moving amount setting means for replacing a standard moving amount based on an avoiding operation of the driver with an avoiding moving amount calculated by the avoiding moving amount calculating means when the avoiding operation determining means determines that the avoiding operation has been performed by the driver; and
   vehicle movement control means for controlling lateral movement of the vehicle so that the actual vehicle moving amount calculated by the actual vehicle moving amount calculating means agrees with the avoiding moving amount.

2. The vehicle operation assisting system according to claim 1, wherein the actual vehicle moving amount calculating means calculates the lateral acceleration of the vehicle as the actual vehicle moving amount in a period of the avoiding operation; and in a period of the restoring operation, a linear sum of the lateral acceleration and the yaw rate of the vehicle is calculated as the actual vehicle moving amount, while a relative percentage of the linear sum based on the yaw rate is gradually increased by gradually decreasing a relative percentage of the linear sum based on the lateral acceleration.

3. The vehicle operation assisting system according to claim 1, wherein the actual vehicle moving amount calculating means calculates the yaw rate of the vehicle as the actual vehicle moving amount during normal operation, which follows the restoring operation.

4. The vehicle operation assisting system according to claim 1, wherein the avoiding operation determining means determines the initiation of obstacle avoiding operation by a driver.

5. The vehicle operation assisting system according to claim 1, wherein the avoiding operation determining means selectively determines whether or not the driver performs an operation for avoiding an obstacle in different modes based on comparison of a calculated time to collision to a predetermined time.

6. The vehicle operation assisting system according to claim 5, wherein when the calculated time to collision is greater than the predetermined time, the avoiding operation determining means operates in a first mode in which it determines whether or not the driver performs an operation for avoiding an obstacle based on the operation of a brake pedal by the driver and operation of a steering wheel by the driver, and when the calculated time to collision is equal to or less than the predetermined time, the avoiding operation determining means operates in a second mode in which it determines whether or not the driver performs an operation for avoiding an obstacle based only on the operation of the steering wheel by the driver.

7. The vehicle operation assisting system according to claim 1, wherein when the avoiding operation determining means determines the start of the avoiding operation for avoiding the obstacle, the actual vehicle moving amount calculating means calculates an actual vehicle moving amount mainly based on the lateral acceleration of the vehicle.

8. The vehicle operation assisting system according to claim 1, wherein when the avoiding operation determining means determines the start of the restoring operation, the actual vehicle moving amount calculating means calculates an actual vehicle moving amount so as to gradually change from being mainly based on the lateral acceleration of the vehicle to being mainly based on the yaw rate of the vehicle.

9. A vehicle operation assisting system which assists an obstacle avoiding operation of a vehicle and a restoring operation following the avoiding operation, comprising:
   an obstacle detector which detect an obstacle ahead of a vehicle;
   an avoiding operation detector which determines the obstacle avoiding operation of the vehicle by a driver;
   an avoiding moving amount calculator which calculates an avoiding moving amount necessary to avoid the obstacle based on an output of the obstacle detector;
   an actual vehicle moving amount calculator which calculates an actual vehicle moving amount from a yaw rate and a lateral acceleration of the vehicle;
   a target vehicle moving amount setter which replaces a standard moving amount based on an avoiding operation of the driver with an avoiding moving amount calculated by the avoiding moving amount calculator when the avoiding operation detector determines that the avoiding operation has been performed by the driver; and
   a vehicle movement controller which controls lateral movement of the vehicle so that the actual vehicle moving amount calculated by the actual vehicle moving amount calculator agrees with the avoiding moving amount.

10. The vehicle operation assisting system according to claim 9, wherein the actual vehicle moving amount calculator calculates the lateral acceleration of the vehicle as the actual vehicle moving amount in a period of the avoiding operation; and in a period of the restoring operation, a linear sum of the lateral acceleration and the yaw rate of the vehicle is calculated as the actual vehicle moving amount, while a relative percentage of the linear sum based on the yaw rate is gradually increased by gradually decreasing a relative percentage of the linear sum based on the lateral acceleration.

11. The vehicle operation assisting system according to claim 9, wherein the avoiding operation detector determines the initiation of obstacle avoiding operation by a driver.

12. The vehicle operation assisting system according to claim 9, wherein the avoiding operation detector selectively determines whether or not the driver performs an operation for avoiding an obstacle in different modes based on comparison of a calculated time to collision to a predetermined time.

13. The vehicle operation assisting system according to claim 12, wherein when the calculated time to collision is greater than the predetermined time, the avoiding operation detector operates in a first mode in which it determines whether or not the driver performs an operation for avoiding an obstacle based on the operation of a brake pedal by the driver and operation of a steering wheel by the driver, and when the calculated time to collision is equal to or less than the predetermined time, the avoiding operation detector operates in a second mode in which it determines whether or not the driver performs an operation for avoiding an obstacle based only on the operation of the steering wheel by the driver.

14. The vehicle operation assisting system according to claim 9, wherein when the avoiding operation detector determines the start of the avoiding operation for avoiding the obstacle, the actual vehicle moving amount calculating means calculates an actual vehicle moving amount mainly based on the lateral acceleration of the vehicle.

15. The vehicle operation assisting system according to claim 9, wherein when the avoiding operation detector determines the start of the restoring operation, the actual vehicle moving amount calculator calculates an actual vehicle moving amount so as to gradually change from being mainly based on the lateral acceleration of the vehicle to being mainly based on the yaw rate of the vehicle.

* * * * *